Patented Feb. 27, 1951

2,543,487

UNITED STATES PATENT OFFICE 2,543,487

COMPOSITION FOR TREATING MINERAL WOOL

Anton E. Budner, Alfred F. Buckman, and Margaret M. Rendall, Racine, Wis., assignors to S. C. Johnson & Son, Inc., Racine, Wis.

No Drawing. Application June 9, 1948, Serial No. 32,036

2 Claims. (Cl. 260—29.6)

This invention relates to mineral wool treated with a water-repellent material. More particularly it relates to mineral wool which has been treated with an aqueous emulsion comprising mineral oil, emulsifying agent and polybutene, having a molecular weight of from about 500 to 15,000. This invention also relates to a method of preparing this emulsion and to the method of applying it to mineral wool.

Mineral wool has long been treated with mineral oil both for the purpose of settling the dust and for rendering the mineral wool water-repellent. While a small amount of mineral oil is satisfactory for dust settling, a much larger amount is necessary to render the wool even partially water-repellent.

Numerous attempts have been made to find the substance for this purpose which is more satisfactory than mineral oil. However, those compositions which have been proposed to increase the water-repellency of the mineral wool have usually failed to provide sufficient coverage.

The rock wool manufacturers have recently desired an improved mineral wool which would be sufficiently water-repellent to pass what has been termed the boiling water test. This test comprises floating treated mineral wool on boiling water and continuing the boiling for as long as 3½ to 4 hours. The ability of the mineral wool to withstand these conditions and continue to float for as long as 3½ hours is highly desirable to the rock wool manufacturers. Little, if any, mineral wool commercially marketed today is able to withstand this boiling water test.

Now, in accordance with our invention, we have developed an aqueous emulsion suitable for treating mineral wool which comprises mineral oil, emulsifying agent, water and polybutene having a molecular weight of from 500 to about 15,000, said polybutene constituting from about 10% to about 35% by weight of the mineral oil present in the emulsion. If desired, wax may be incorporated in the emulsion to assist in increasing the water repellency of the composition.

Mineral wool which has been treated with this composition has successfully passed the boiling water test as it will remain afloat for over 3½ hours.

We have also developed a method for preparing the water-repellent material which comprises heating the mineral oil, emulsifying agent and polybutene until the mixture is molten and then adding to water with sufficient agitation to disperse the molten mixture. The resulting emulsion is a stable emulsion which remains stable even though diluted with from 10 to 15 parts of water per part of emulsion. The emulsion may be homogenized, if desired, to render increased stability.

We have also developed a method of treating the mineral wool with this emulsion which comprises flowing the emulsion, in a manner hereinafter described, which has been diluted with 10 to 15 parts of additional water, into a mixing zone and concomitantly flowing mineral oil into said mixing zone at a rate of about 2 to 3 parts of emulsion per part of mineral oil, then applying for example, by spraying the mixture on mineral wool.

Now, having indicated in a general way the nature and purpose of this invention, the following example will illustrate the invention. It is to be understood, however, that such examples are presented merely as illustrations of the invention, and are not to be construed as limiting the same. In the example, the ingredients are given in parts by weight, unless otherwise indicated.

Example 1

One hundred seventy five parts of paraffin oil (refined mineral oil) having a Saybolt Universal viscosity at 100° F. of about 90 to 100 seconds, 60 parts oleic acid and 37 parts of polybutene having a molecular weight of about 950 were charged into an open vessel and heated. Twenty five parts triethanolamine was slowly added. The heating was continued with agitation for about 30 minutes at a temperature of around 200° F. Twelve parts of microcrystalline paraffin having a melting point of about 165° F. was added. Agitation was continued until the wax had been dispersed throughout the mixture. The molten mixture was then added to 300 parts of hot water with sufficient agitation to disperse the mixture. A stable emulsion resulted.

This emulsion was then diluted with 12 parts of water to each part of emulsion and flowed into a mixing zone at a rate of 15 cubic centimeters per second. Concomitantly, refined mineral oil was flowed into the mixing zone at a rate of 4 to 6 cubic centimeters per second. The resulting mixture was then sprayed upon mineral wool as it entered the settling chamber. The resulting treated mineral wool withstood for more than 3½ hours the boiling water test, was dust free and showed a coverage of just over 32 cubic feet per 40 pound bag.

Whereas in Example 1 paraffin oil having a Saybolt Universal viscosity of 90 to 100 seconds at 100° F. was used, the invention is not so limited. Any mineral oil having a Saybolt Universal viscosity at 100° F. within the range of about 60 to about 1500 seconds is operable. However, the use of refined mineral oil having a viscosity of 60 to 350 seconds is preferred.

The polybutenes which are operable in this invention vary in molecular weight from about 500 to about 15,000. It has been found that polybutenes having a molecular weight of less than 500 are too soft, whereas polybutenes having molecular weight above 15,000 are too difficult to handle for satisfactory use in the emulsion. Those polybutenes possessing molecular weights of about 700 to about 3,000 are preferred because of ease of handling, availability and cost.

Triethanolamine oleate is used as the emulsifying agent in Example 1. However, it will be appreciated, by those skilled in the art, that any of a wide variety of emulsifying agents can be satisfactorily employed. Ammonia or any amine combined with any fatty acid is operable as the agent. Potash or soda soaps of any of the common fats are also expedient. Also operable are anionic emulsifying agents such as sodium lauryl sulphate dioctyl ester of sodium sulphosuccinic acid and non-ionic agents such as ethylene oxide condensates of long chain fatty acids and alcohols, and polyoxyethylene derivatives of fatty esters such as sorbitan monolaureate. However, their comparative high cost occasions them to be less desirable for use commercially. Other well known emulsifying agents such as mineral sulphonates or so called "mahogany soaps" and sulphonated vegetable oils may also be used.

Although microcrystalline wax was used in the example, other waxes are also operable. Various mineral waxes such as paraffin, ozocerite, etc. are operable. Vegetable waxes such as carnauba, ouricury, etc., may be used. In addition, animal waxes such as beeswax may be employed.

Whereas the temperature used in preparing the emulsion in Example 1 was around 200° F., this is not the maximum operable temperature. Such temperatures may be extended, but obviously precautions should be taken when introducing the soap-oil-wax mixture to water at a temperature appreciably above the boiling point of water. The minimum temperature at which the emulsion can be prepared must be at least the mutual melting point of the solids.

The emulsion described in Example 1 contained approximately 50% by weight of ingredients other than water. This may be varied by reduction or augmentation of any of the variable component solids, e. g., more or less wax may be used, depending upon the film desired, dispersibility, etc. As in Example 1, the emulsion must be sufficiently stable before being diluted with the additional 10 to 15 parts of water so as to enable handling and shipping of the emulsion in the undiluted form.

Although Example 1 described a process wherein the emulsion was flowed into a mixing zone at the rate of 15 cubic centimeters per second, it should be realized that the rate of such flow can be varied within a range of about 10 to about 16 cubic centimeters per second. The rate then, depends upon the desired consistency and finish.

Ordinarily the amount of diluted emulsion when mixed with mineral oil prior to application will be about 2½ parts per part of mineral oil. This may be varied, however, to obtain the characteristics and water-repellency desired in the mineral wool.

By the practising of our invention, a water-repellent mineral wool is obtained which greatly increases the commercial uses of mineral wool. Now realized is the desire, not only to control the bothersome wool dust, but also to provide sufficient coverage in rendering the wool water-repellent. This realization proves to be a great advancement in the industry for mineral wool can now be produced which is water-repellent at very little cost to the ultimate consumer.

Having described our invention, it is to be understood that the foregoing is by way of illustration. Therefore, additions, substitutions, modifications and changes may be made therein without departing from the spirits of our invention, which is intended to be limited only as required by the prior art.

We claim:

1. An aqueous emulsion concentrate suitable for rendering mineral wool capable of floating on boiling water for a period of at least 3½ hours, consisting essentially of mineral oil having a Saybolt viscosity at 100° F., of from 60 to 1500 seconds, emulsifying agent, water and polybutene, said water being present in a quantity of approximately 50% by weight of said emulsion concentrate, said polybutene having a molecular weight of from about 500 to 15,000 and constituting from 10 to 35% by weight of the mineral oil present in the emulsion concentrate, said emulsion concentrate being capable of remaining stable upon dilution with water up to 15 parts of water per part of emulsion concentrate.

2. An aqueous emulsion concentrate suitable for rendering mineral wool capable of floating on boiling water for a period of at least 3½ hours, consisting essentially of mineral oil having a Saybolt viscosity at 100° F., of from 60 to 1500 seconds, emulsifying agent, water and polybutene, said water being present in a quantity of approximately 50% by weight of said emulsion concentrate, said polybutene having a molecular weight of from about 700 to 3,000 and constituting from 10 to 35% by weight of the mineral oil present in the emulsion concentrate, said emulsion concentrate being capable of remaining stable upon dilution with water up to 15 parts of water per part of emulsion concentrate.

ANTON E. BUDNER.
ALFRED F. BUCKMAN.
MARGARET M. RENDALL.

REFERENCES CITED

The following references are of record in the file of this patent:

UNITED STATES PATENTS

| Number | Name | Date |
| --- | --- | --- |
| 295,748 | Fries | Mar. 25, 1884 |
| 2,061,570 | Frolich et al. | Nov. 24, 1936 |
| 2,155,630 | Anderson | Apr. 25, 1939 |
| 2,189,854 | Brown et al. | Feb. 13, 1940 |
| 2,278,207 | Mathes | Mar. 31, 1942 |